US006208357B1

(12) United States Patent
Koga et al.

(10) Patent No.: US 6,208,357 B1
(45) Date of Patent: Mar. 27, 2001

(54) METHOD AND APPARATUS FOR CREATING AND ANIMATING CHARACTERS HAVING ASSOCIATED BEHAVIOR

(75) Inventors: Yoshihito Y. Koga, Palo Alto; David J. Zhu, Fremont; Craig Becker; Michael J. Svihura, both of Mountain View; Geoffrey T. Annesley, Palo Alto, all of CA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/060,415

(22) Filed: Apr. 14, 1998

(51) Int. Cl.[7] .................................................. G06T 15/00
(52) U.S. Cl. ............................................ 345/473; 345/474
(58) Field of Search ..................................... 345/473, 474, 345/302; 395/500; 700/178

(56) References Cited

U.S. PATENT DOCUMENTS

| 3,585,628 | * | 6/1971 | Harrison, III ........................ 345/473 |
| 5,079,713 | * | 1/1992 | Kawamura et al. ................. 700/178 |
| 5,416,497 | * | 5/1995 | Nishi et al. ........................... 345/473 |
| 5,680,619 | * | 10/1997 | Gudmundson et al. ............. 345/302 |
| 5,689,684 | * | 11/1997 | Mulchandani et al. ......... 395/500.44 |
| 5,852,450 | * | 12/1998 | Thingvold ........................... 345/473 |
| 5,986,675 | * | 11/1999 | Anderson ............................ 345/473 |

* cited by examiner

Primary Examiner—Cliff N. Vo
(74) Attorney, Agent, or Firm—Kenneth L. Milik; Lawrence E. Monks (57) ABSTRACT

A system is provided for displaying an animated character. The system identifies a character for display and identifies at least one skill associated with the identified character. The system also determines at least one behavior associated with the identified character. The identified character is then animated based on the skill and the behavior associated with the identified character. Animation of the character can also be based on an environment in which the identified character is displayed. The skill associated with the identified character can be used to generate animation in multiple environments. The behavior associated with the animated character is environment-independent and is used to determine the manner in which the identified character responds to an event. A hierarchical finite state machine can be used to represent the behavior associated with the identified character. The system is also capable of creating an animated character by selecting a character model associated with the animated character. A set of skills and a behavior are associated with the animated character, in which the behavior adapts to multiple environments.

39 Claims, 11 Drawing Sheets

FIG. 11

METHOD AND APPARATUS FOR CREATING AND ANIMATING CHARACTERS HAVING ASSOCIATED BEHAVIOR

FIELD OF THE INVENTION

The present invention relates to the field of character animation. More specifically, the invention provides a system for creating and animating characters, in which the characters may have one or more associated behaviors and in which the characters can act and react appropriately in a dynamically changing environment.

BACKGROUND

Animated characters are used in a variety of applications, such as movies, cartoons, computer-based games, and computer-based simulations. Existing applications are available for creating two-dimensional (2D) and three-dimensional (3D) static character models. These existing programs include 3D Studio Max™ manufactured by Kinetix of San Francisco, Calif. and Adobe Photoshop™ manufactured by Adobe Systems Inc. of San Jose, Calif.

Existing systems are available to animate a character. These existing systems animate characters by requiring a sequence of key frames to be created (e.g., by animators or artists) and filling in the in-between frames automatically. Generally, this sequence of key frames is environment-specific. Thus, to generate similar character movement in a different environment, a separate sequence of key frames must be created and the in-between frames generated.

For linear applications of character animation (such as those in movies and television), where the environment and the character's movement within it can be predetermined, these sequential animation systems may be sufficient, although not necessarily efficient. The inefficiency is due to the low-level key frame animation that needs to be created by hand, particularly for complex interaction among a large number of characters and between each character and the environment.

For real-time interactive applications of character animation (such as those in computer games and other computer-based simulations) where the environment and the interaction of the characters with the environment may be changing dynamically, these sequential animation systems are not sufficient. Today, these sequential animation systems are being used to pre-generate animation sequences for character animation. During runtime, based on the situation and the desired motion of the character, the appropriate animation sequence is selected and executed to animate the character in the desired manner. By doing that, the interaction between the character and the environment is limited by the number of pre-generated movements available. Certain interactions between the character and the environment may appear unrealistic because a pre-generated movement does not exist for every possible situation and every possible interaction between the character and the environment. For example, a character may have a pre-generated movement that causes the character to grasp an object. Depending on the location of the object to be grasped, the character may need to reach for the object or bend down to pick up the object. Unless a particular sequence of frames has been generated for the required movement in the specific environment, then the motion of the character may appear unrealistic.

Additionally, the pre-generation of movements is time-consuming and expensive. Each pre-generated movement is associated with a particular character movement in a particular environment. Thus, as the number of potential movements increases or the number of potential environments increases, the number of pre-generated movements also increases. For example, if a particular character may grasp an object that can be positioned in twenty different locations, a pre-generated grasping motion may be required for each of the twenty locations.

Using existing systems, since a designer cannot provide a pre-generated movement for every possible character interaction in every possible environment the designer must limit the number of possible situations encountered by the character. This puts a severe limitation on content design.

The use of pre-generated movements by existing systems also requires a significant amount of bandwidth to transmit the pre-generated movements to the system implementing the character. A system requiring a high bandwidth may not be practical in certain network-based applications. In particular, systems requiring high-bandwidth communication links are not well-suited for Internet use. In bandwidth-limited environments, the use of pre-generated movements may not be permitted or may result in the irregular and unrealistic movement of the character.

It is therefore desirable to provide a character animation system that produces a realistic interaction between the character and its environment, even when the environment is changing dynamically, without requiring the generation of environment-specific motion sequences. It is also desirable to provide a character animation system that requires minimal bandwidth to implement the character animation in a network environment.

SUMMARY OF THE INVENTION

Embodiments of the present invention provide a character animation system that produces motion sequences that represent a realistic interaction between the character and its environment, without requiring environment-specific sequences of key frames to be specified. Embodiments of the present invention also provide a character animation system that requires minimal bandwidth to implement the character animation in a network environment.

An embodiment of the invention provides a system for displaying an animated character by identifying a character for display. The system then identifies at least one skill associated with the identified character and determines at least one behavior associated with the identified character. The identified character is then animated automatically based on the skill and the behavior associated with the identified character.

In a particular embodiment of the invention, animation of the identified character is further based on an environment in which the identified character is displayed.

In another embodiment of the invention, the behavior associated with the animated character is environment-independent.

Other embodiments of the invention use a hierarchical finite state machine to represent the behavior associated with the identified character.

Another embodiment of the invention provides a system for creating an animated character by selecting a character model associated with the animated character. The system then associates a set of skills with the animated character and associates a behavior with the animated character. Both the skills and the behavior associated with the animated character adapts to multiple environments.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Embodiments of the present invention provide a character animation system that produces a realistic interaction between the character and its environment. Embodiments of the invention also provide a character animation system that allows characters to be created quickly, without requiring the generation of a significant number of pre-generated movement sequences. Embodiments of the present invention utilize a set of skills associated with each character and one or more behaviors associated with each character. The skills associated with a character include, for example, walking, jumping, or manipulating an object. The behavior associated with a character defines the movement or animation of the character in response to various situations or events. For example, a behavior may cause a character to walk to a door in response to a knock at the door. The behavior associated with a particular character is defined in the form of a hierarchical finite state machine (HFSM). The HFSM allows a character developer to identify the character's various states and the transitions between the various states. A transition between states may be based on the completion of a previous activity, a change in the environment, or may be triggered by other events.

Character movements and activities are controlled using task-level commands rather than pre-generated movements. For example, a command "walk to door" can cause a character to walk to the identified door. The character's motion is generated on-the-fly automatically, such that the character avoids obstacles along the way. A character's behavior is described in these task-level commands. This high-level behavior programming allows a character to respond more intelligently in a dynamic environment. Additionally, the same character can be used in different environments because the character is able to adapt to a new environment using the same behavior definitions. Furthermore, the bandwidth requirements for deploying characters created based on the present invention are significantly less than the bandwidth requirements in systems that transmit pre-generated movements. The reduced bandwidth requirements permit communication of information across the Internet and other bandwidth-limited communication links.

The teachings of the present invention may be applied to any system using an animated character, such as games and simulations. As used in this specification, an animated character can be any type of character including animals, plants, people, machines, and inanimate objects. Additionally, an animated character may be a camera or other recording device that follows another object or character or otherwise records or monitors information. An animated character can also be a light, such as a spotlight. The teachings of the present invention can be applied to both two-dimensional characters and three-dimensional characters.

Figure 1:
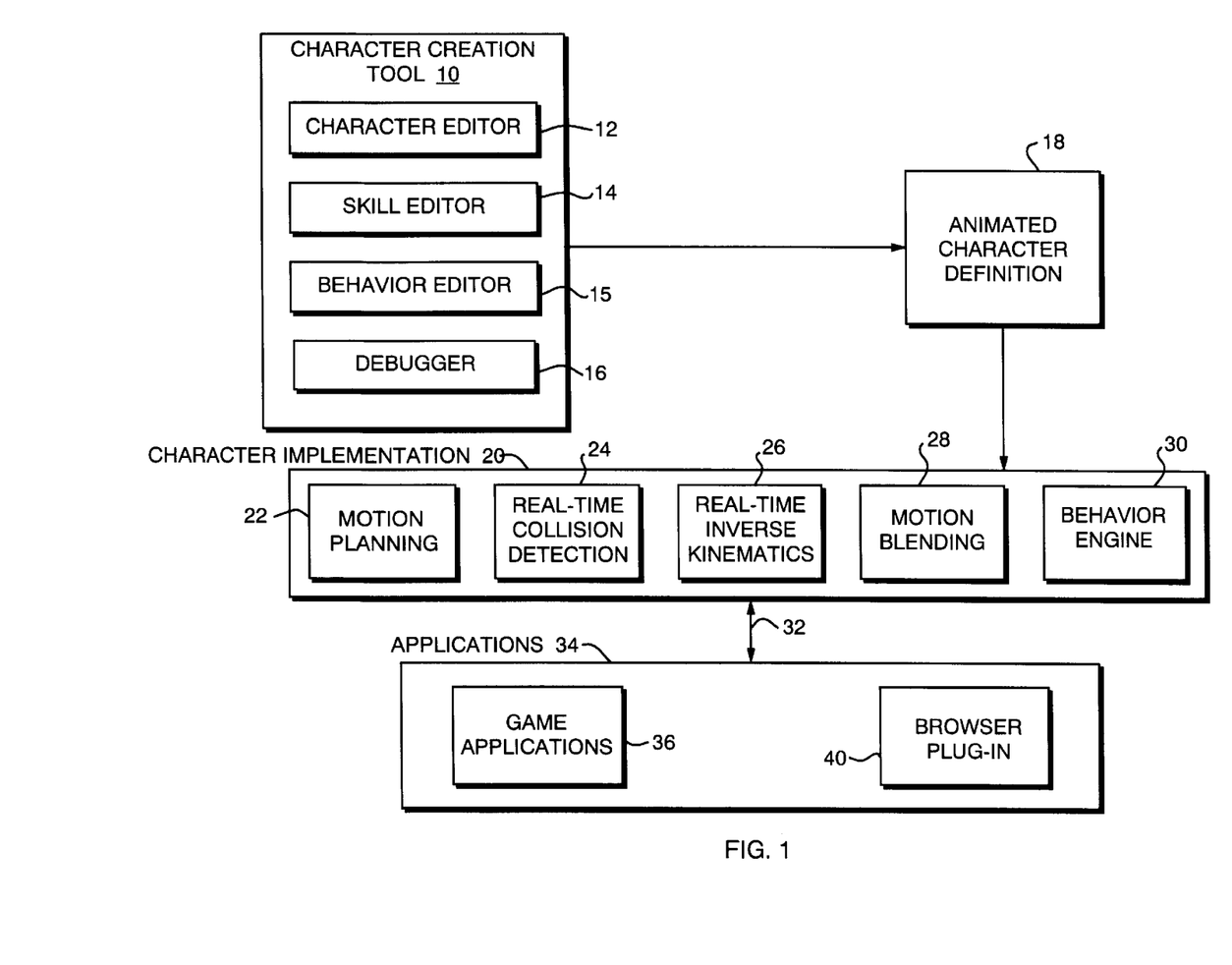
FIG. 1 illustrates an embodiment of a character creation tool used to generate an animated character definition and a character implementation system used to implement an animated character.

FIG.1 illustrates an embodiment of a character creation tool used to create an animated character definition. FIG. 1 also illustrates a character implementation system used by one or more applications to implement an animated character as defined in the animated character definition. A character creation tool 10 includes a character editor 12, a skill editor 14, a behavior editor 15, and a debugger 16. Character creation tool 10 permits the generation of characters that can adapt to any environment. Thus, instead of generating a character for a particular environment, character creation tool 10 allows characters to be generated that can be used in any environment and are capable of adapting to new or changing environments.

Character editor 12 is used to edit the character's model, including its skeletal hierarchy, geometry, and texture. This skeletal hierarchy includes the structure or structural appearance of the character, pivot points of the character's features and limbs as well as the relative position, orientation, and scale of the character's features and limbs. Additionally, the character's home position, which is a default skeletal configuration, is defined using the character editor. Joint limits and other information regarding the physical movements of the character can be defined using the character editor 12. Collision information can also be associated with a character and the character's limbs. Various types of 2D and 3D modeling applications, such as 3D Studio Max™ discussed above, can be used to create and edit a character's model, including its skeletal hierarchy, geometry, and texture, to be imported into the character editor.

Skill editor 14 defines the character's available skills, such as walking, sitting, or grasping objects. In one embodiment of the invention, a character's skills are divided into three categories: basic skills (also referred to as gestures), locomotion skills, and manipulation skills. A locomotion skill is a skill that allows the character to move from one location to another, such a walking, running, or crawling. A manipulation skill is used to define a particular interaction between the character and an object or another character. Examples of manipulation skills include grasping or touching an object, and sitting on an object. A basic skill or gesture is any skill not used for locomotion or manipulation, such as waving, smiling, or laughing. Various 2D and 3D animation applications, such as 3D Studio Max™, or motion capture system can be used to generate and edit a character's skills to be imported into the skill editor. A particular skill may also be defined by an algorithm that describes the necessary movements of the character.

Behavior editor 15 allows one or more behaviors to be created and associated with a character. Each behavior is represented by a HFSM containing embedded procedural codes or scripts. These embedded procedural codes or scripts are later compiled to a byte code format that is architecture-neutral. In one embodiment of the invention, behavior editor 15 provides a graphical interface for creating or editing HFSMs. A behavior associated with a character can be activated and deactivated on-the-fly. For example, a particular behavior may be activated when a character is located within a building, but the behavior is deactivated when the character is located outside the building. Furthermore, more than one behavior can be activated at the same time. Additional details regarding behavior editor 15 are provided below.

Debugger 16 provides a mechanism for testing and debugging character hierarchies, character skills, and character behaviors. Debugger 16 allows the developer of the character to view the character's interaction with the environment as various behaviors are executed. The particular portion of the script or algorithm being executed can be displayed simultaneously with the character to identify the command or instruction causing the current character movement or activity.

After a particular character has been created and defined using character editor 12, and provided with various skills using skill editor 14 and provided with one or more behaviors using behavior editor 15, character creation tool 10 generates an animated character definition 18 that defines the overall operation and behavior of the character. Character definition 18 contains information regarding the character's hierarchy, skills, and behavior.

Figure 2:
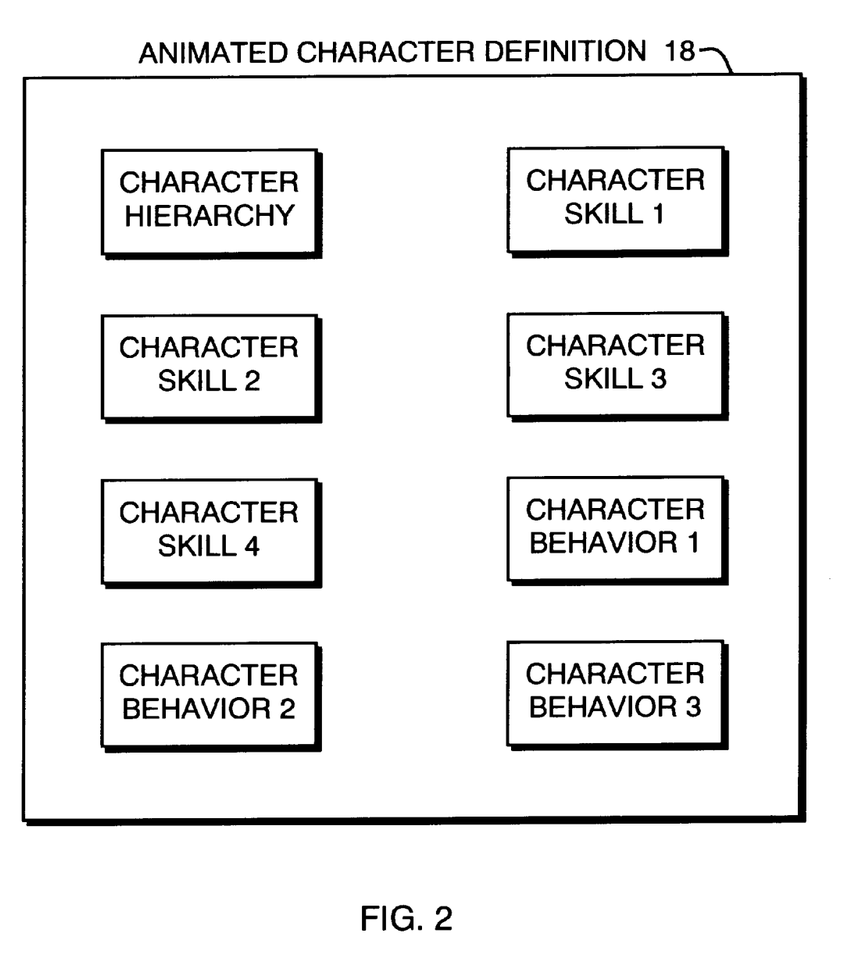
FIG. 2 illustrates an embodiment of an animated character definition.

FIG. 2 illustrates an embodiment of animated character definition 18. The embodiment of FIG. 2 includes several separate files (a character hierarchy file, four character skill files, and three character behavior files). A particular character definition may contain a character hierarchy file, any number of character skill files, and any number of character behavior files. Although FIG. 2 illustrates a separate file for each hierarchy, skill, and behavior, alternate embodiments of the invention may combine any two or more files into a single file or definition.

Referring again to FIG. 1, animated character definition 18 is used by a character implementation system 20 to implement the defined character, as directed by one or more applications 34. Additionally, character implementation system 20 receives information regarding the environment in which the animated character is acting. The same animated character definition 18 can be used to implement the character in multiple environments, including dynamically changing environments. Thus, the animated character definition is able to adapt to different environments and is not necessarily environment-specific. Additionally, the same animated character definition 18 can be used with multiple character implementation systems. For example, a character generated for use in a computer-based game may be used in different games and may be used in multiple instances of the same game. Character implementation system 20 includes a motion planning module 22 that is used to plan a character's motion (e.g., movement between two locations or reaching for an object) based on obstacles and other objects in the environment. Motion planning module 22 generates a tentative path to be followed by the character. However, the tentative path may change if obstacles or other objects in the environment change as the character moves through the environment. A real-time collision detection module 24 identifies collisions or potential collisions between the character and another object or character in the environment. If a collision or potential collision is detected, character implementation system 20 may alter the path of the character to avoid the collision. Additional details regarding motion planning can be found in *Robot Motion Planning*, Jean-Claude Latombe (Kluwer Academic Publishers, 1991).

A real-time inverse kinematics module 26 is used to provide the motion of the character, including the movement of limbs and joints of the character. A motion blending module 28 is used to "smooth out" the various motions of the character, thereby providing smooth movement of the character. A behavior engine 30 implements the HFSM that defines a character's behavior, as generated by behavior editor 15. Behavior engine 30 maintains the current state of the character, and transitions to the next state upon occurrence of an appropriate event or activity.

One or more applications 34 are coupled to interact with character implementation system 20 through an application programming interface (API) 32. API 32 provides the necessary interface between implementation system 20 and one or more applications that utilize the animated character. For example, game applications 36 may utilize one or more characters acting in a game environment. Character implementation system 20 can be embedded within other applications, such as a browser plug-in with an Internet browser application. As discussed above, animated character definition 18 is not based on pre-generated movements. Instead, the motion is generated on-the-fly based on one or more skills and one or more behaviors, as defined by a HFSM. Thus, the bandwidth requirements to communicate tasks and other skill and behavior information across a communication link is significantly less than the bandwidth required to transmit similar pre-generated motion sequences.

Figure 3:
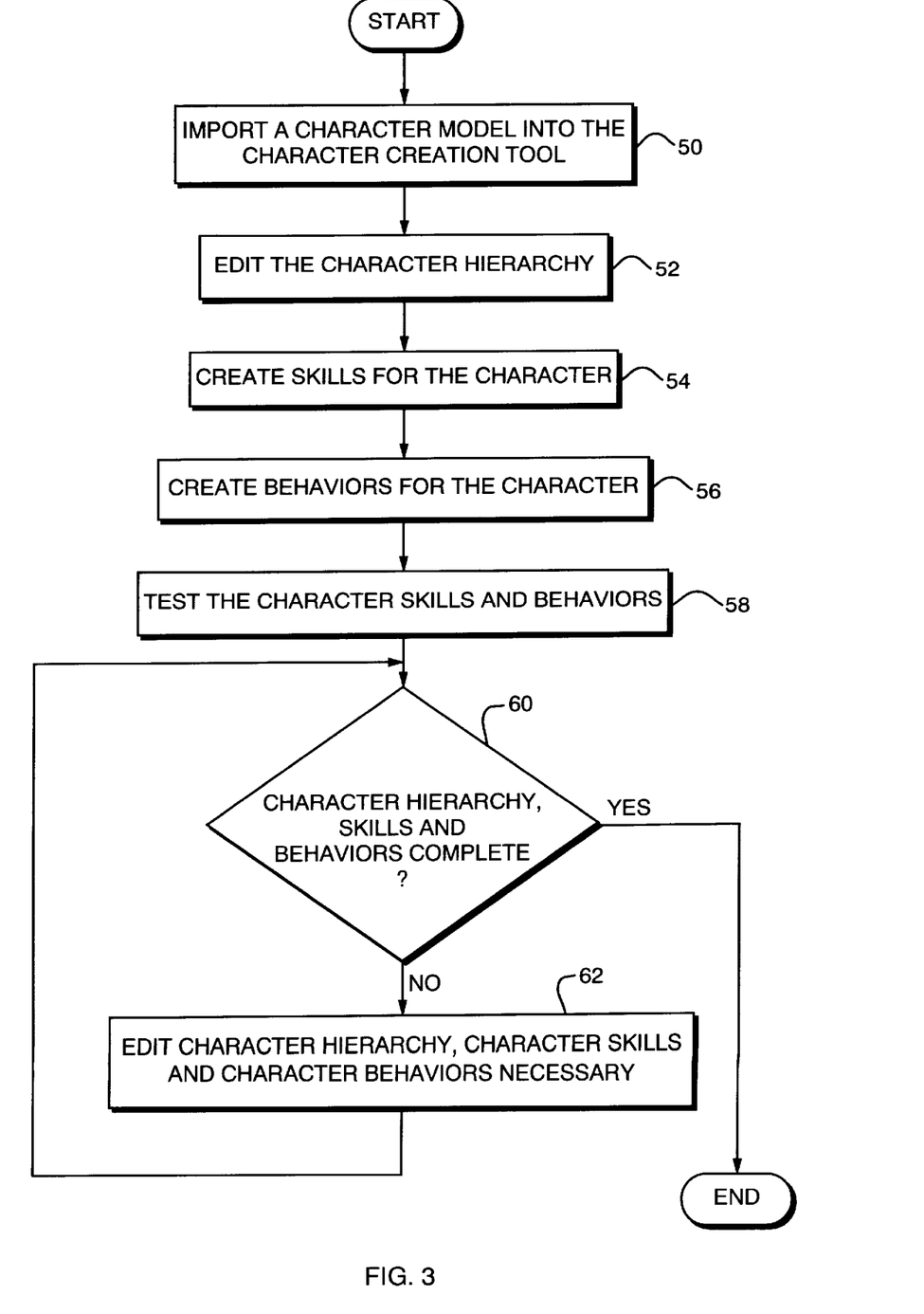
FIG. 3 is a flow diagram illustrating an embodiment of a procedure for creating an animated character.

FIG. 3 is a flow diagram illustrating an embodiment of a procedure for creating an animated character. The procedure of FIG. 3 may be performed by a single character developer or a team of developers. At step 50, the procedure imports a character model into the character creation tool (e.g., character creation tool 10 in FIG. 1). The character model imported in step 50 may include the skeletal, geometric, and material attributes of the character (e.g., the color and texture of the clothing worn by the character). This character model can be created using various types of two-dimensional and three-dimensional modeling and image creation tools. Those of ordinary skill in the art will appreciate that any type of modeling tool or image creation tool can be used to generate the character model imported into the character creation tool.

At step 52, the character hierarchy is edited. These steps may be performed by character editor 12, discussed above with respect to FIG. 1. The character hierarchy defines the skeletal hierarchy, pivot points, home position, and joint limits for the character. At step 54, the procedure creates skills for the character (e.g., using skill editor 14 in FIG. 1). As discussed above, these skills may include locomotion skills, manipulation skills, or basic skills, such as gestures. At step 56, the procedure creates behaviors for the character. As discussed above, these behaviors may be created using behavior editor 15, and are represented in the form of an HFSM. Step 58 tests the character skills and behaviors created in steps 54 and 56. This testing may be performed using debugger 16. The testing performed in step 58 allows the developer to view the movement of the character in various situations and in response to various obstacles or environment changes. Additionally, the system may display both the character movement and the current state of the character simultaneously. This allows the developer to view the current appearance of the character at various points in the HFSM and at various points in the scripts contained within the HFSM.

Step 60 of FIG. 3 determines whether the character hierarchy, skills and behaviors are complete. If the character hierarchy, skills and behaviors are complete (i.e., satisfactory to the developer of the character), then the procedure terminates, having generated an animated character definition. If the character hierarchy, skills or behaviors are not complete, then the procedure continues to step 62 where the character hierarchy, character skills and/or character behaviors are further edited as needed. The procedure then returns to step 58 to test the current character hierarchy, skills and behaviors. Steps 58, 60, and 62 are repeated until the character hierarchy, skills and behaviors are complete or satisfactory to the developer.

Figure 4:
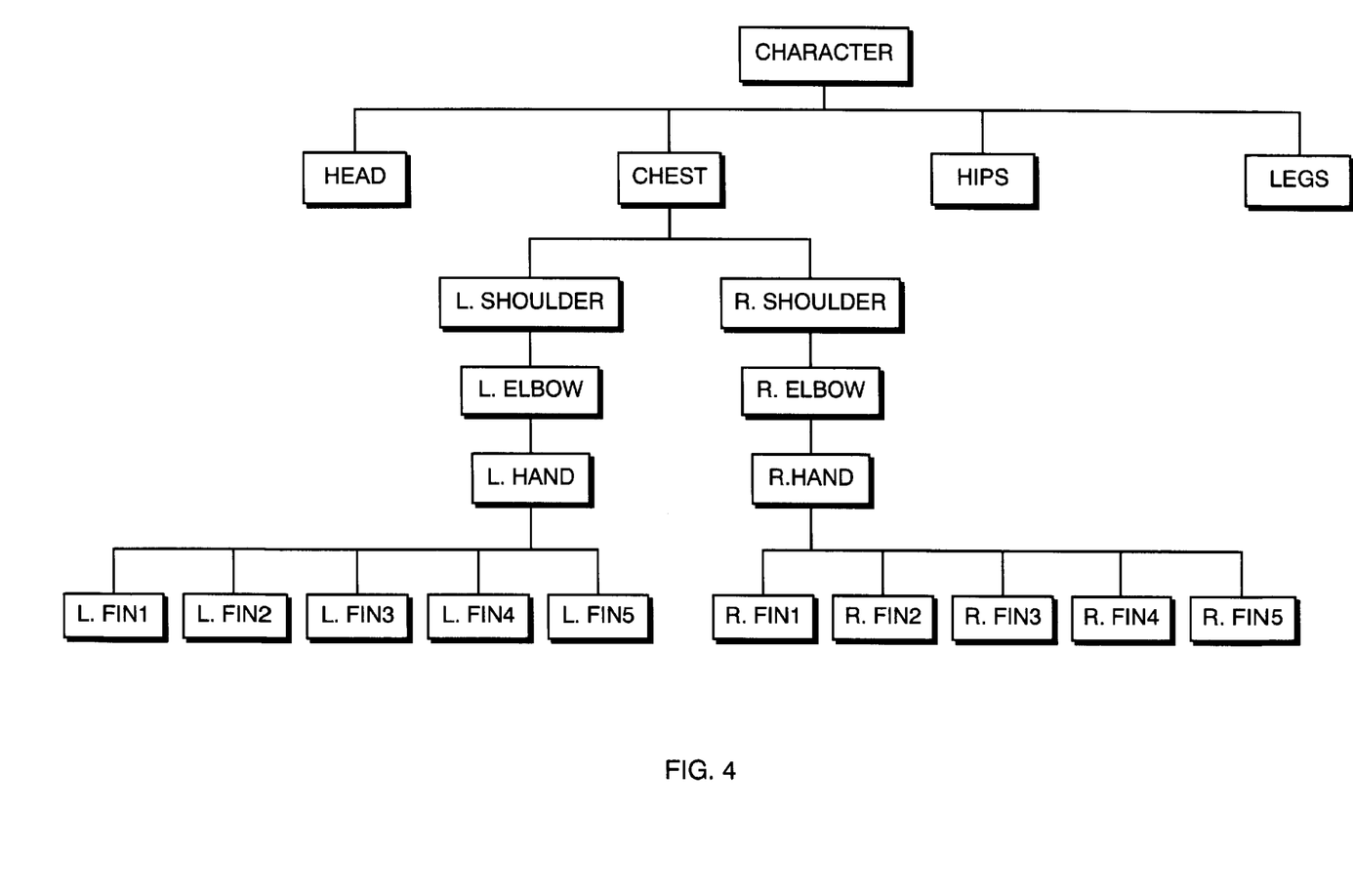
FIG. 4 illustrates an embodiment of a character hierarchy.

FIG. 4 illustrates an embodiment of a character hierarchy. FIG. 4 represents one possible character hierarchy for purposes of illustration. However, those of ordinary skill in the art will appreciate that any number of character hierarchies may be used for a particular character or type of character. In FIG. 4, the character contains four primary areas, a head, chest, hip, and legs. FIG. 4 illustrates only the detailed portion of the subcategories of the chest portion of the character. The chest portion of the character includes the left and right shoulders, left and right elbows, and the left and right hands. Additionally, each hand has further subcategories for each of the five fingers on each hand. This arrangement of the parts of a character allows a developer to define the movement of a particular portion of the character as well as the relationship between various portions of the character. For example, the developer is able individually define the motion of each finger on each hand of the character. Similar subcategories are typically provided for the head portion of the character as well as the hips and the legs.

Figure 5A:
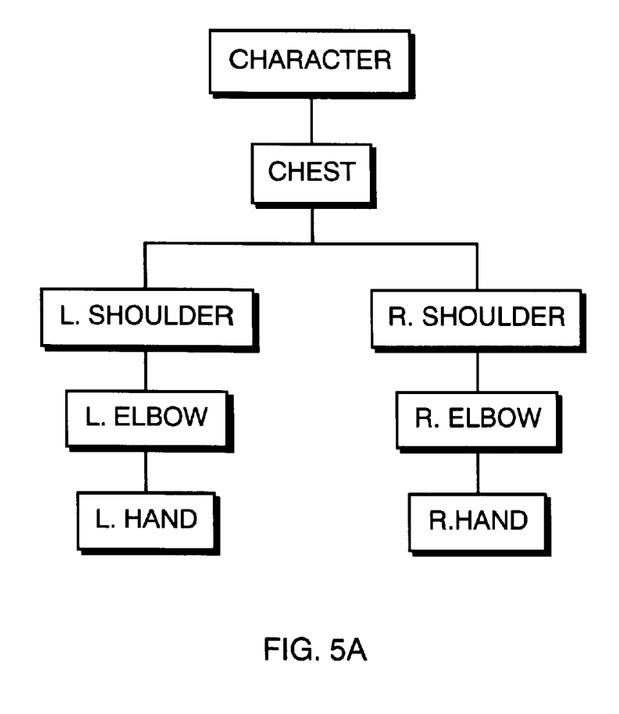
FIGS. 5A and 5B illustrate an embodiment of a character hierarchy and an environment hierarchy.
Figure 5B:
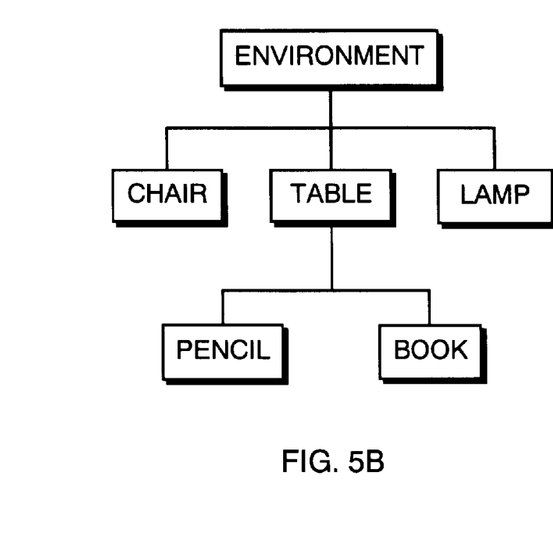

FIGS. 5A and 5B illustrate an embodiment of a character hierarchy and an environment hierarchy. The character hierarchy shown in FIG. 5A contains subcategories similar to those discussed above with respect to FIG. 4. FIG. 5B provides the environment hierarchy within which the character illustrated in FIG. 5A is active. The environment includes a chair, a table, and a lamp. A typical environment may include other objects and features, which have been omitted from FIG. 5B for purposes of explanation. The table has two subcategories, pencil and book, indicating that a pencil and a book are located on the table.

Figure 6A:
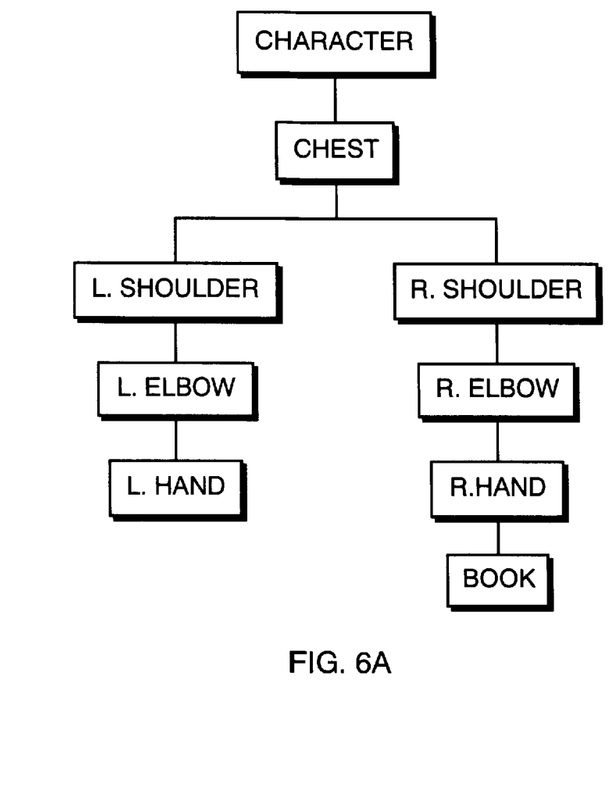
FIGS. 6A and 6B illustrate the character hierarchy and environment hierarchy of FIGS. 5A and 5B after the character grasps an object.
Figure 6B:
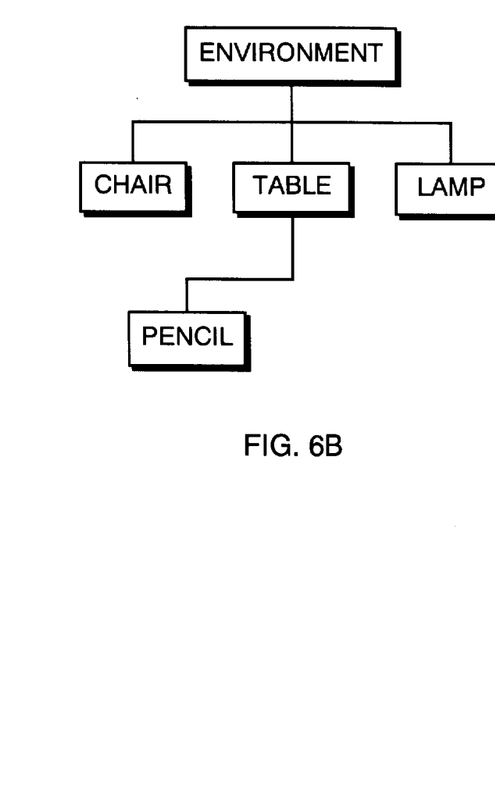

One or more behaviors utilizing various skills may cause the character shown in FIG. 5A to walk to the table in the environment and grasp the book resting on the table. If this activity occurs, the book, which was formally associated with the table, will now be associated with the appropriate hand of the character. FIGS. 6A and 6B illustrate the character hierarchy and environment hierarchy of FIGS. 5A and 5B after the character picks up the book from the table. As shown in FIG. 6A, the book is now associated with the right hand of the character, and FIG. 6B shows that the book is no longer associated with the table.

Figure 7:
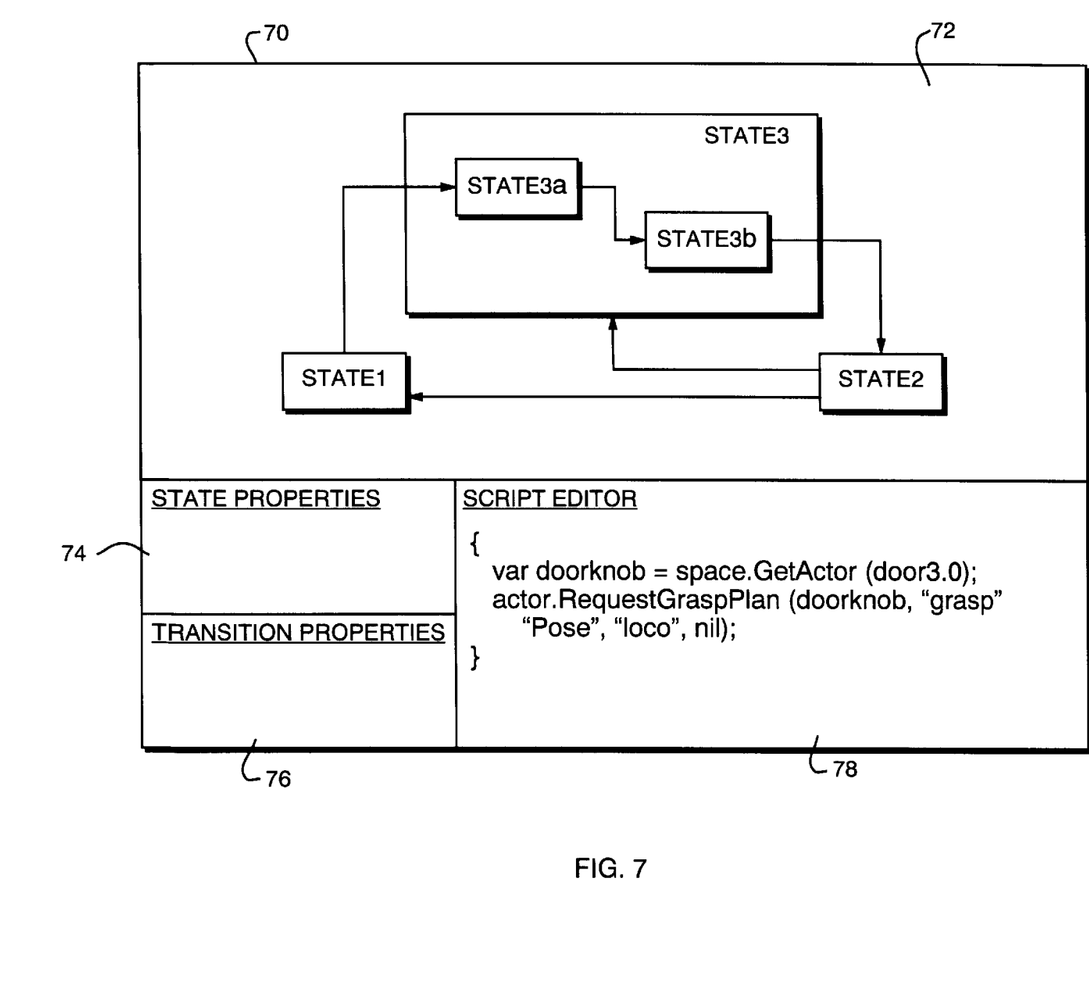
FIG. 7 illustrates an embodiment of a display window provided by a character creation tool.

FIG. 7 illustrates an embodiment of a display window provided by a behavior editor, such as behavior editor 15 in tool 10 shown in FIG. 1. Display window 70 includes four separate frames (or subwindows) 72, 74, 76, and 78. Frame 72 displays the HFSM currently being created or edited. Frame 74 provides various state properties and other information associated with the HFSM displayed in frame 72. These state properties may include the name of the state, the state variables available for use in the HFSM, and various editing commands used to create or edit HFSMs. When a particular state is highlighted, the various state properties associated with the highlighted state are displayed in Frame 74. Frame 76 displays various transition properties and other information related to transitions from one state to another. These transition properties may include one or more scripts associated with each transition. These scripts may cause various activities to occur upon exiting one state and entering another state. When a particular transition is highlighted, the various transition properties associated with the transition are displayed in Frame 76. Frame 78 is used to display a script associated with one or more states or transitions in the HFSM shown in frame 72. A script may describe what should occur when an actor enters a certain state or traverses a particular transition. Typically, separate scripts are used for each state and for each transition When a debugger in the character creation tool (e.g., debugger 16 in character creation tool 10, shown in FIG. 1) is active, the movement of the animated character can be viewed simultaneously with the current state of the HFSM. Additionally, information regarding the current state, the current script being executed, and any transitions is shown along with the animated character in its environment. This simultaneous display allows the developer of the animated character to view the character motions generated by each state, each transition, and each command or instruction in the script being executed. The debugger is also capable of recording a series of events and allowing the developer to trace the movements of the animated character back to a particular event. When the developer selects a recorded event, the debugger displays the state that the system was in when the selected event occurred. Additionally, the debugger displays any transitions that occurred in response to the selected event. The recording of events may be performed on a selected basis. For example, the debugger may record only a particular type of event (such as an event generated by a collision), as determined by the developer. In a particular embodiment of the invention, the Piccolo programming language is used to generate scripts used and implemented by the character animation system. Piccolo is an object-based programming language specifically designed for programming behaviors associated with animated characters. The Piccolo language is used to describe the activities associated with the states and transitions of a particular HFSM. The Piccolo programming language is available from The Motion Factory of Fremont, Calif. In alternate embodiments of the invention, other programming languages are used to generate scripts. For example, the C++ or Java™ (Java is a trademark of Sun Microsystems, Inc.) family of programming languages can be used to generate scripts. Those of ordinary skill in the art will appreciate that other programming languages and scripting languages can be used to describe the various activities associated with states and transitions. Various breakpoints can be inserted in the script or HFSM to temporarily halt the character's movement for viewing by the developer as part of a debugging process.

The HFSM shown in frame 72 contains five different states: State1, State2, State3, State3a, and State3b. State3 is referred to as a composite state because it contains two other states, State3a and State3b. Each state may be associated with a particular activity or status of the character. For example, State1 may be a state in which the character is sitting in a chair. The character remains in that state until a particular activity occurs, such as a ringing doorbell. When the doorbell rings, the HFSM transitions from State1 to State3. State3 contains various activities and movements performed by the character in response to the doorbell. For example, the character may stand up, walk toward the door, grasp the doorknob, and open the door. When the character finishes talking to the individual that rang the doorbell, the HFSM transitions to State2. At this point, if the doorbell rings again shortly after closing the door, the character may again perform the steps necessary to open the door in State3. Alternatively, the character may return to State1, which causes the character to walk to the chair and sit in the chair. Frame 78 displays a script associated with the grasping of a doorknob.

Figure 8:
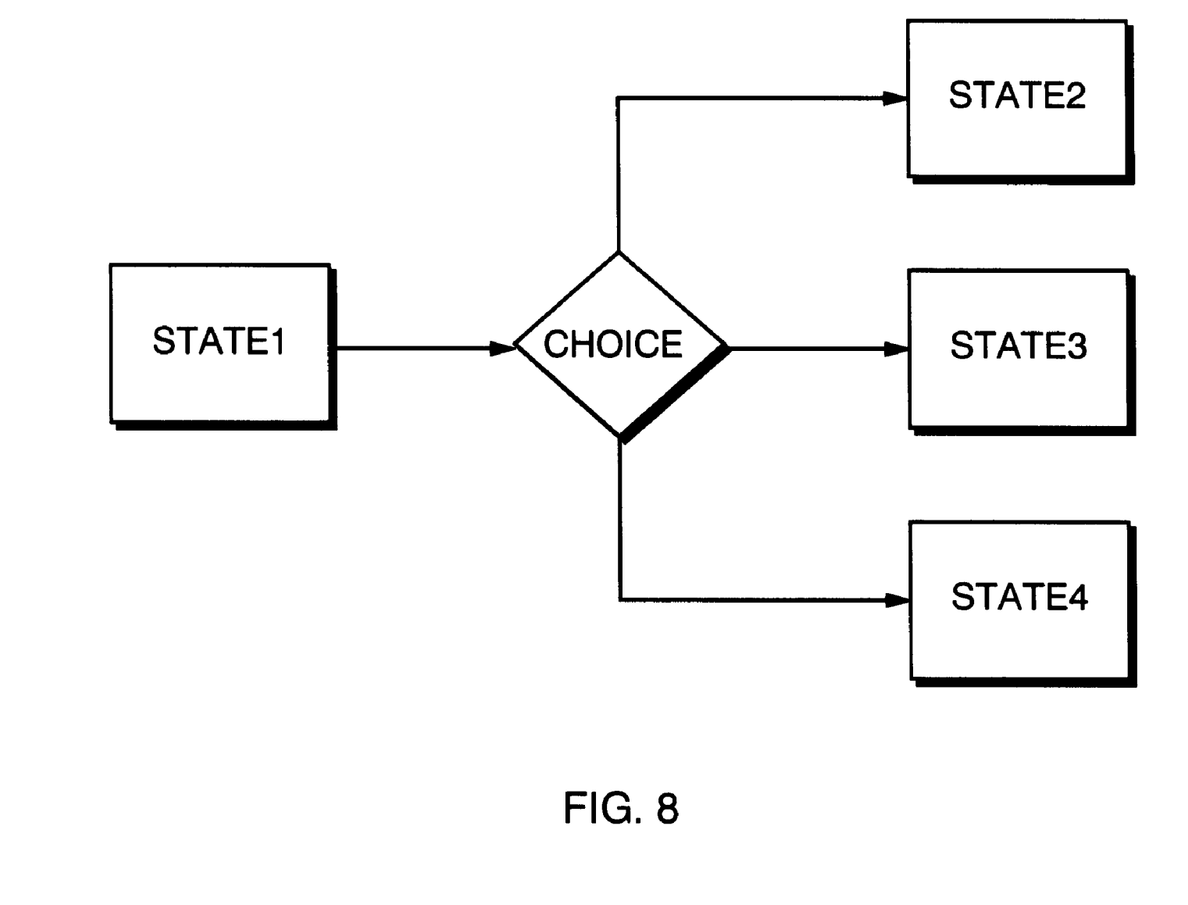
FIGS. 8 and 9 illustrate embodiments of hierarchical finite state machines that may be used to define a character's behavior.

FIG. 8 illustrates an embodiment of an HFSM that can be used to define a character's behavior. The example of FIG. 8 includes a branching point or choice point for transitioning from one state to another. Initially, the character is in State 1. When a particular activity occurs, the HFSM transitions from State1 to the branch point. Depending on the current situation or other activities, the HFSM then transitions to State2, State3, or State4. A branching point or choice point can have any number of incoming transitions and any number of outgoing transitions.

Figure 9:
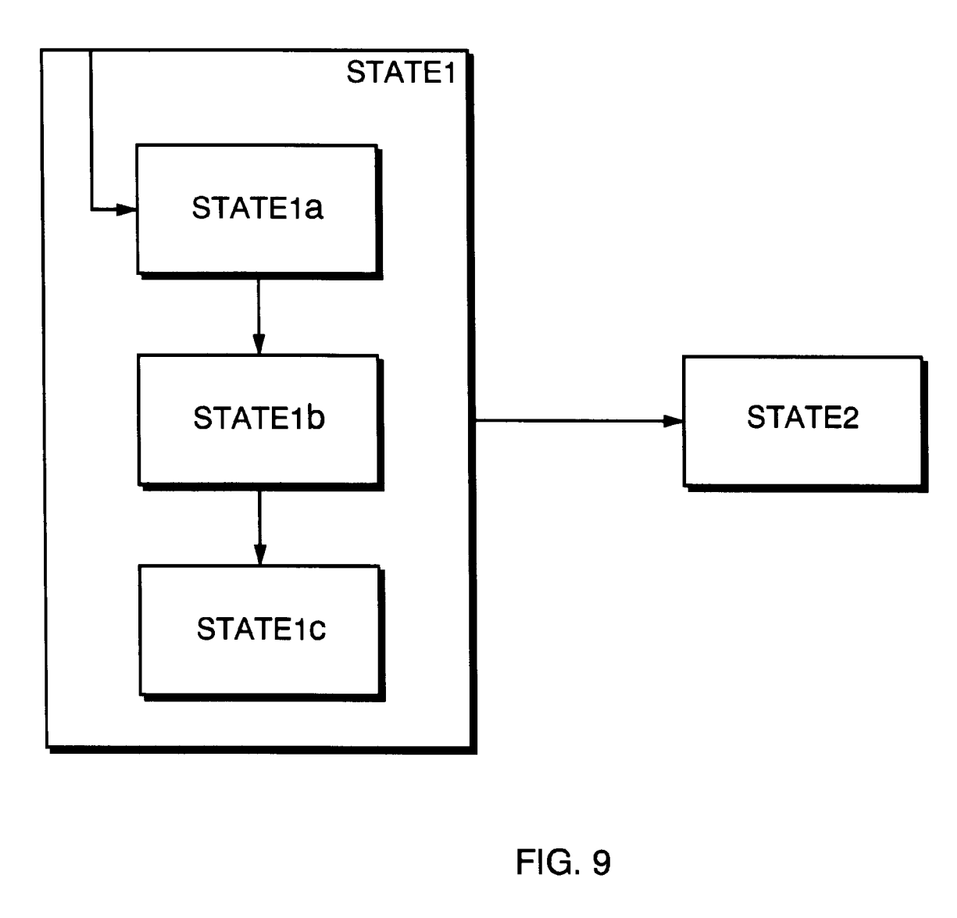

FIG. 9 illustrates another embodiment of an HFSM that can be used to define a character's behavior. State1 includes three substates, State1a, State1b, and State1c. When State1 is initially entered, the HFSM transitions to State1a. The HFSM may then transition to State1b and State1c. The transition from State1 to State2 is not associated with any particular substate within State1. Therefore, if the activity or event that causes a transition from State1 to State2 occurs when the HFSM is in State1a, State1b, or State1c, the HFSM transitions from the current state to State2. The HFSM embodiments shown in FIGS. 7–9 illustrate exemplary HFSM structures. However, those of ordinary skill in the art will appreciate that numerous other HFSM structures and configurations can be used with the present invention.

Figure 10:
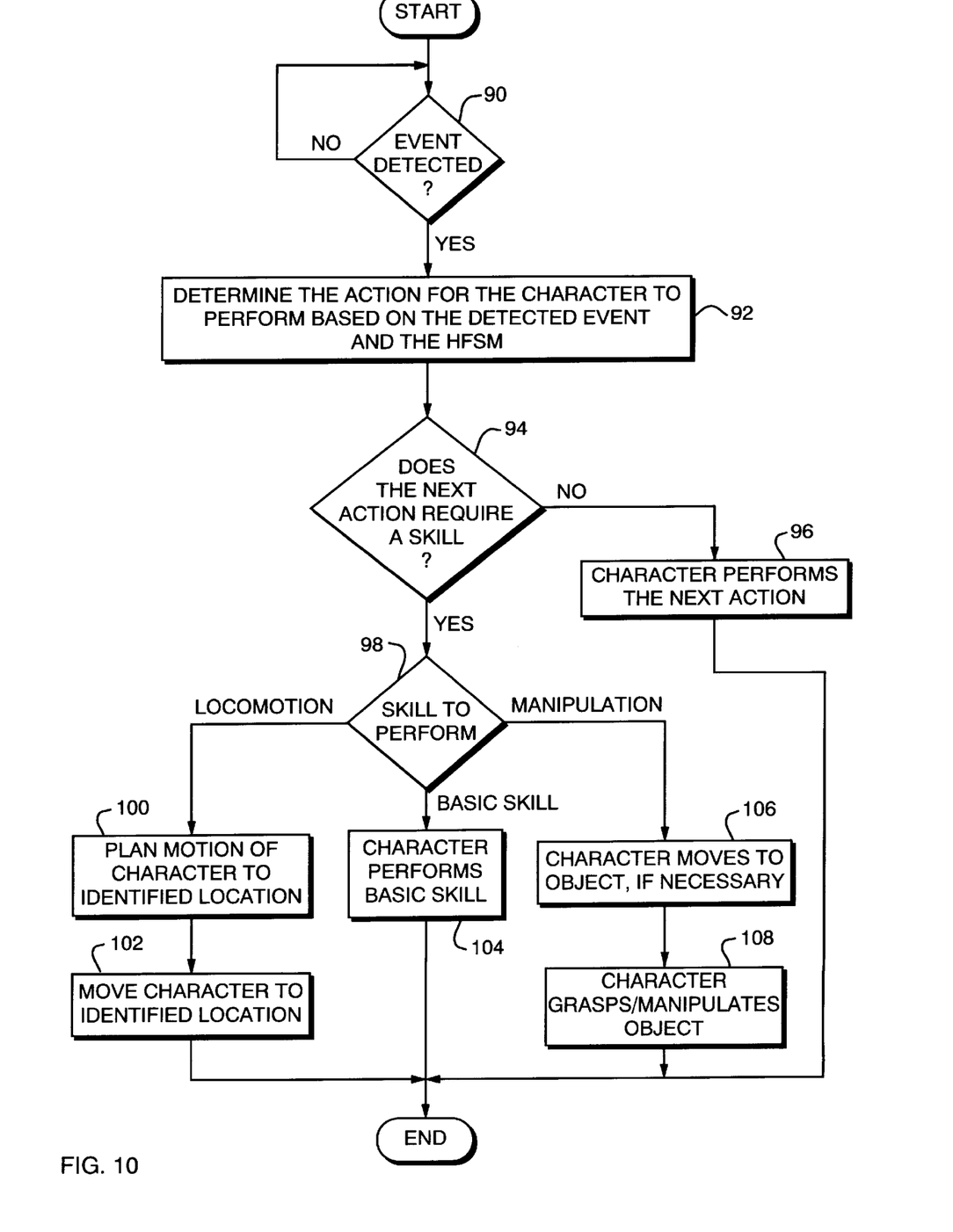
FIG. 10 is a flow diagram illustrating an embodiment of a procedure for implementing an animated character.

FIG. 10 is a flow diagram illustrating an embodiment of a procedure for implementing an animated character. At step 90, the procedure determines whether an event or other activity that would cause a transition from one state to another has been detected. If no event or activity has been detected, the procedure continues to monitor the system or environment for any such activity or event. If an event or activity is detected by step 90, the procedure continues to step 92 to determine the action or motions for the character to perform based on the detected event and the HFSM. The procedure then continues to step 94 to determine whether the next action requires a skill. If not, the procedure branches to step 96 where the next action is performed, and the procedure ends. In another embodiment of the invention, the procedure returns to step 90 and awaits the next event detection.

If the next action does require a skill, then the procedure continues from step 94 to step 98 to determine what type of skill or skills are involved in the next action of the character. As discussed above, the three general types of skills (locomotion, manipulation, and basic skills) may be required for a character to be implemented. If the next action requires locomotion skills, then the procedure branches to step 100, where a motion planning module plans the motion of the character from its current location to the identified location (i.e., the character's destination). The procedure continues to step 102 where the character is moved to the identified location. As the character moves to the identified location, the real-time collision detection module monitors the character's movement and adjusts the movement as necessary to avoid obstacles in the environment.

If the next action of the character requires a basic skill, such a gesture, the procedure continues to step 104 where the character performs the necessary basic skill. If the next action to be performed by the character is a manipulation, the procedure branches from step 98 to step 106, where the character moves to the object to be manipulated, if necessary. The procedure then continues to step 108 where the character grasps the object or otherwise manipulates the object as described in the HFSM.

Although step 98 illustrates a branch to one of three different steps depending on the next action, a particular action may require multiple skills (e.g., locomotion skills as well as manipulation skills). In that example, steps 100, 102, 106, and 108 are performed by the procedure. Thus, step 98 may cause the procedure to branch into multiple paths that are executed simultaneously. Additionally, one or more skills may be performed simultaneously with one or more other actions (step 96) that do not require skills. The actual skills and actions performed by a particular character are defined by the HFSM, as discussed above.

Figure 11:
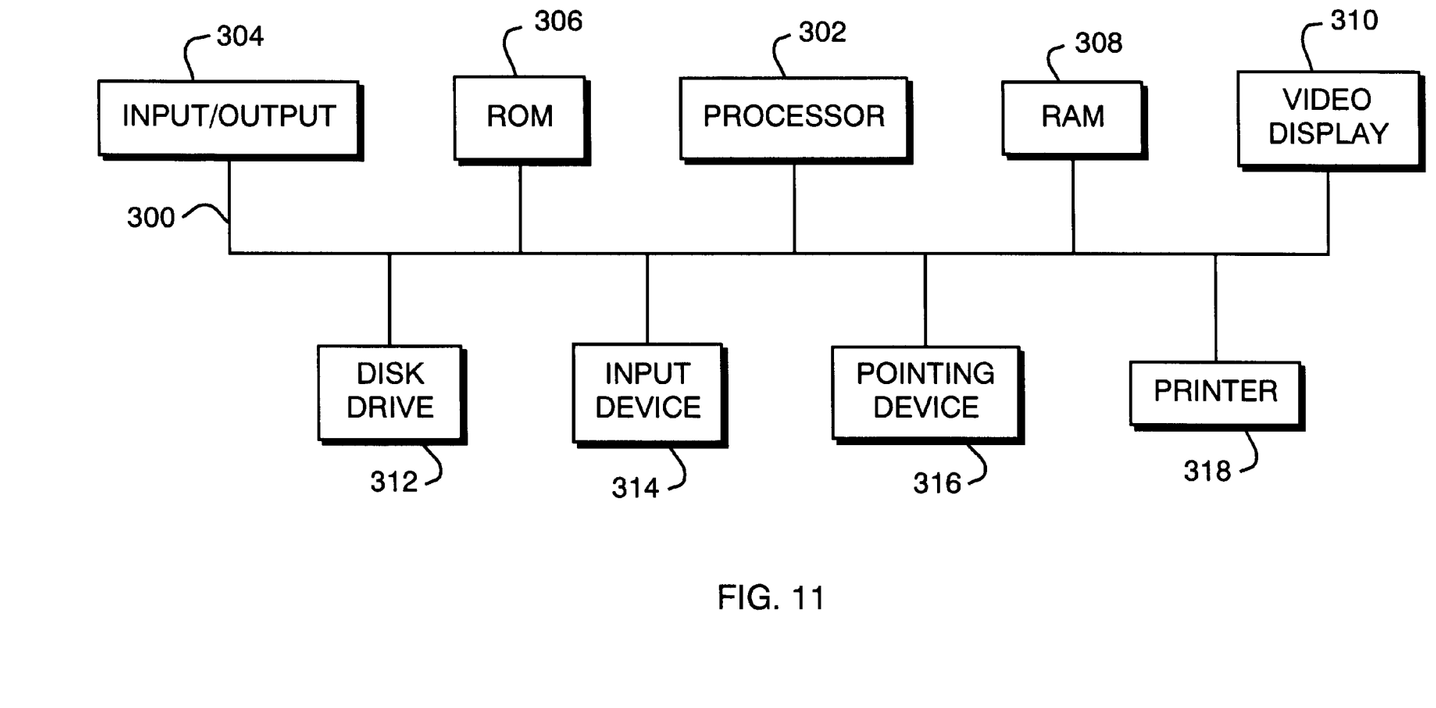
FIG. 11 illustrates an embodiment of a computer system that can be used with the present invention.

FIG. 11 illustrates an embodiment of a computer system that can be used with the present invention. For example, embodiments of the invention may use a computer of the type shown in FIG. 11 for creating or implementing animated characters. The various components in FIG. 11 are provided by way of example. Certain components of the computer in FIG. 11 can be deleted for particular implementations of the invention. The computer system shown in FIG. 11 may be any type of computer, including a general purpose computer.

FIG. 11 illustrates a system bus 300 to which various components and devices are coupled. A processor 302 performs the processing tasks required by the computer. Processor 302 may be any type of processing device capable of implementing the steps necessary to perform the various procedures and operations discussed above. An Input/Output (I/O) device 304 is coupled to bus 300 and provides a mechanism for communicating with other devices coupled to the computer. A Read-Only Memory (ROM) 306 and a Random Access Memory (RAM) 308 are coupled to bus 300 and provide a storage mechanism for various data and information used by the computer. Although ROM 306 and RAM 308 are shown coupled to bus 300, in alternate embodiments, ROM 306 and RAM 308 are coupled directly to processor 302 or coupled to a dedicated memory bus (not shown).

A video display 310 is coupled to bus 300 and displays various information and data to the user of the computer. A disk drive 312 is coupled to bus 300 and provides a mechanism for the long-term mass storage of information. An input device 314 and a pointing device 316 are also coupled to bus 300 and allow the user of the computer to enter information and commands to the computer system. Input device 314 may be, for example, a keyboard, keypad, handwriting recognition device, or voice recognition device. Pointing device 316 includes, for example, a mouse, track ball, or touch pad. A printer 318 is coupled to bus 300 and is capable of creating a hard copy of information generated by or used by the computer.

Embodiments of the present invention may be implemented using a computer-readable medium (also referred to as a processor-readable medium) containing various sets of instructions, code sequences, configuration information, and other data used by a computer or other processing device. The various information stored on the computer-readable medium is used to perform various operations, such as those described above. In particular, the information stored on the computer-readable medium can be used to create and display animated characters on a display device. The computer-readable medium may be any type of magnetic, optical, or electrical storage medium including a diskette, magnetic tape, CD-ROM, memory device, or other storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of displaying an animated character, the method comprising the steps of:

identifying a character for display;

identifying at least one skill associated with the identified character;

determining at least one behavior associated with the identified character; and automatically animating the identified character with said at least one skill in response to said at least one behavior associated with the identified character.

2. The method of claim 1 wherein the step of animating the identified character is further based on an environment in which the identified character is displayed.

3. The method of claim 1 wherein the skill associated with the identified character can be used to generate animation in a plurality of environments.

4. The method of claim 1 wherein the behavior associated with the animated character is environment-independent.

5. The method of claim 1 wherein the behavior associated with the identified character determines the manner in which the identified character responds to an event.

6. The method of claim 1 wherein the behavior associated with the identified character is represented as a hierarchical finite state machine.

7. The method of claim 6 wherein the hierarchical finite state machine includes a plurality of states and a plurality of transitions between the plurality of states.

8. The method of claim 6 wherein the hierarchical finite state machine includes at least one script written in a scripting language.

9. The method of claim 1 wherein the step of animating the identified character includes planning motion of the identified character in an environment.

10. The method of claim 1 wherein the step of animating the identified character further includes identifying potential collisions between the identified character and other objects in an environment.

11. The method of claim 10 wherein the step of animating the identified character further includes altering the motion of the identified character if a potential collision is detected.

12. A method of creating an animated character, the method comprising the steps of:

selecting a character model associated with the animated character;

associating a set of skills with the animated character; and associating a behavior with the animated character, wherein the behavior adapts to a plurality of environments.

13. The method of claim 12 wherein the behavior allows animation of the character based on the character's environment and the character's set of skills.

14. The method of claim 12 wherein the behavior determines the manner in which the animated character responds to an event.

15. The method of claim 12 wherein the behavior determines the manner in which the animated character acts in a particular situation.

16. The method of claim 12 wherein the behavior associated with the animated character is represented as a hierarchical finite state machine.

17. The method of claim 16 wherein the hierarchical finite state machine includes a plurality of states and a plurality of transitions between the plurality of states.

18. The method of claim 16 wherein the hierarchical finite state machine includes at least one script written in a scripting language.

19. The method of claim 12 wherein the behavior associated with the animated character determines the movement of the animated character in response to events.

20. The method of claim 12 further including the step of testing the movement of the animated character.

21. The method of claim 20 wherein the step of testing the animated character movement displays the animated character appearance and the state of the animated character simultaneously.

22. A method of debugging an animated character, the method comprising the steps of:

a. displaying the animated character;

b. highlighting a current state of a state machine representing a behavior associated with the animated character;

c. displaying a script associated with the current state of the state machine representing the behavior associated with the animated character; and d. recording events that occur as the character is animated.

23. The method of claim 22 wherein steps a, b, and c are performed simultaneously.

24. The method of claim 22 wherein the step of recording events further includes selectively recording events that occur as the character is animated.

25. The method of claim 22 further including the step of tracing the recorded events to determine which state generated a particular recorded event.

26. The method of claim 22 further including the step of tracing the recorded events to determine which state received a particular recorded event.

27. The method of claim 22 further including the step of tracing the recorded events to determine a transition caused by a particular recorded event.

28. An animated character generator comprising:

a character editor;

a skill editor coupled to the character editor for generating at least one skill associated with said animated character; and a behavior editor coupled to the skill editor, wherein the behavior editor generates character behaviors that are environment-independent and cause the automatic performance of said at least one skill associated with said animated character.

29. The animated character generator of claim 28 further including a debugger coupled to the behavior editor.

30. The animated character generator of claim 28 wherein the debugger is configured to simultaneously display an animated character and a character behavior associated with the animated character.

31. A computer software product including a medium readable by a processor, the medium having stored thereon a sequence of instructions which, when executed by the processor, cause the processor to:

identify the character for display;

identify at least one skill associated with the identified character;

determine at least one behavior associated with the identified character, and automatically animating the identified character with said at least one skill in response to said at least one behavior associated with the identified character.

32. The computer software product of claim 31 wherein the sequence of instructions which cause the processor to animate the identified character further animate the identified character based on an environment in which the identified character is displayed.

33. The computer software product of claim 31 wherein the behavior associated with the animated character is environment-independent.

34. The computer software product of claim 31 wherein the behavior associated with the identified character is represented as a hierarchical finite state machine.

35. A computer software product including a medium readable by a processor, the medium having stored thereon a sequence of instructions which, when executed by the processor, cause the processor to:

select a character model associated with an animated character;

associate a set of skills with the animated character; and associate a behavior with the animated character, wherein the behavior adapts to a plurality of environments and cause the automatic performance of said at least one skill associated with said animated character.

36. The computer software product of claim 35 wherein the behavior allows animation of the character based on the character's environment and the character's set of skills.

37. A method comprising:

identifying a character;

associating a set of skills with the character, each skill of the set of skills comprising an act or series of acts the character may perform in one or more animated environments;

associating a set of behaviors with the character, each behavior of the set of behaviors determining one or more skills the character will perform in the one or more animated environments in response to an event associated with the behavior; and automatically animating the character by causing a particular event associated with a particular behavior of the set of behaviors that evokes the character to perform one or more skills associated with the particular behavior.

38. The method of claim 37 wherein the character's particular movements in the performance of the one or more skills are based on conditions and other objects in a particular animated environment.

39. The method of claim 37 wherein the character's specific movements in performance of the one or more skills are adapted to a particular animated environment in which said animating the character by causing a particular event is performed.

* * * * *